June 22, 1965  M. J. KIRCHHOEFER  3,190,509
APPARATUS FOR CONTINUOUS GRAVITY FEED OF FLUENT MATERIALS
Filed March 25, 1963  2 Sheets-Sheet 1

Martin J. Kirchhoefer
INVENTOR.

June 22, 1965  M. J. KIRCHHOEFER  3,190,509
APPARATUS FOR CONTINUOUS GRAVITY FEED OF FLUENT MATERIALS
Filed March 25, 1963
*Fig. 2*
| CONTACT NO. | V1 | V2 | V3 | V4 |
|---|---|---|---|---|
| 1 | C | C | O | C |
| 2 | O | C | O | C |
| 3 | Cx | C | Cx | C |
| 4 | C | C | C | Ox |
| 5 | C | Ox | C | O |
| 6 | C | Cx | C | Cx |
| 1 | C | C | Ox | C |
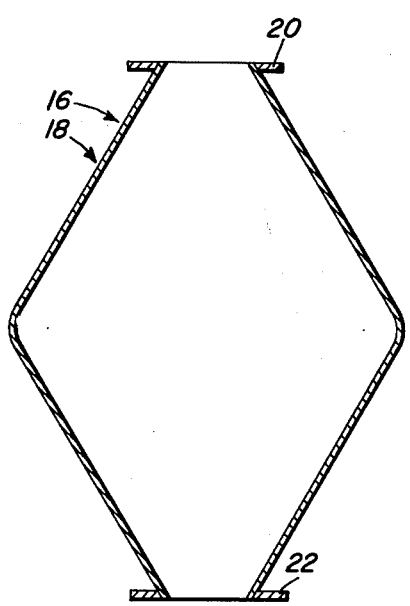
*Fig. 3*
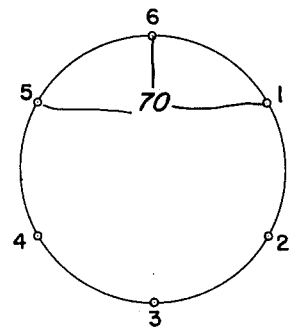
*Fig. 4*
Martin J. Kirchhoefer
INVENTOR.
BY *[signatures]*
Attorneys United States Patent Office 3,190,509
Patented June 22, 1965

3,190,509
APPARATUS FOR CONTINUOUS GRAVITY FEED OF FLUENT MATERIALS
Martin J. Kirchhoefer, Wisconsin Rapids, Wis., assignor to Pulpamac, Inc., Wisconsin Rapids, Wis., a corporation of Wisconsin
Filed Mar. 25, 1963, Ser. No. 267,526
3 Claims. (Cl. 222—450)

This invention comprises a novel and useful method for the continuous gravity feed of fluent materials and more particularly pertains to a method and apparatus for effecting the gravity feed of fluent materials from a relatively low pressure or atmospheric source of supply into a sealed receptacle at above atmospheric pressure or at a relatively higher pressure than that of the source of supply.

In many commercial processes, it is desired to effect a continuous and uninterrupted rate of flow of materials into a receptacle sealed at an above atmospheric pressure.

It is therefore the primary purpose of this invention to provide an apparatus and a method which will effectively enable fluent materials to be delivered from an atmospheric or other low pressure source of supply and discharged in a continuous uninterrupted flow at a variably controlled rate into a receptacle and at the pressure of that receptacle.

A further object of the invention is to provide an apparatus and a method in accordance with the preceding object which shall effectively introduce batches of material from the source of supply into a pressurizing chamber, then raise this pressure to that of the receptacle, intermittently supply the pressurized batches into a storage chamber, and continuously but at a variably controlled rate deliver material from the storage chamber into the receptacle at the desired pressure of the latter.

Still another purpose of the invention is to provide an apparatus which will accomplish the above-mentioned objects and which shall be entirely automatic in its operation.

A further object of the invention is to provide an apparatus in accordance with the foregoing objects having solenoid operated valves for effecting the step-by-step travel of the material under gravity from a source of supply and into the receptacle and wherein the solenoid operated valves may be all cyclically controlled by an automatic timing mechanism and in proper sequence.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a diagram illustrating the cyclic operation of certain control valves of the apparatus and method;

FIGURE 3 is a view in vertical longitudinal section through one of the intermediate chambers of the apparatus; and FIGURE 4 is a diagrammatic view of the timed operation of the solenoid controlled valves of the invention.

Figure 1:
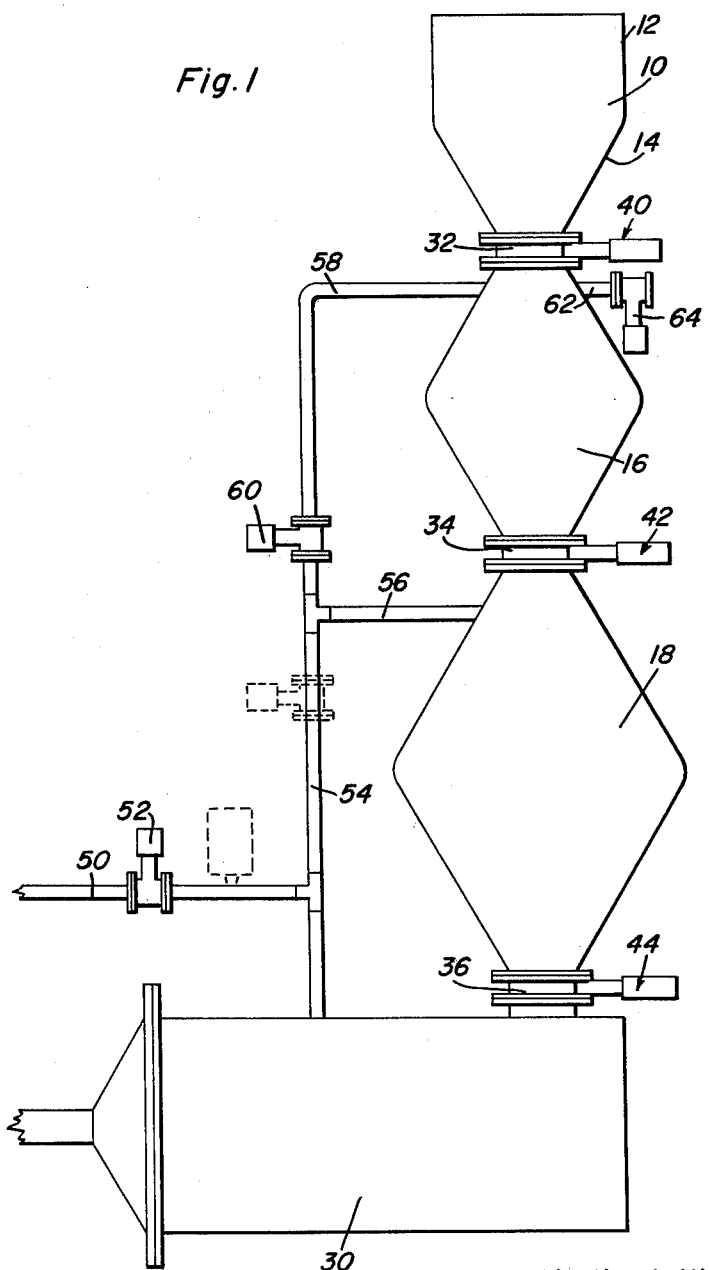
FIGURE 1 is a diagrammatic view showing a suitable form of apparatus in accordance with the principles of this invention.

The apparatus shown in FIGURE 1 of the method of this invention enables a fluent material of any desired character to be supplied from a low pressure source into a relatively high pressure receptacle in a continuous but adjustable rate of flow. By way of example, the device is adapted to feed pulp chips into a pulp digester although obviously it may be employed to feed any other fluent material. An important feature of the invention is that it simplifies the feeding of the fluent and usually solid material by arranging the components of the apparatus such that the feed may be entirely under the influence of gravity from the source of supply through all stages of the feeding apparatus and into the receptacle which in itself may constitute some apparats for performing a chemical or commercial operation under superatmospheric pressure.

In the diagrammatic view of FIGURE 1, the numeral 10 designates a hopper into which fluent material may be fed from time-to-time to provide a source of supply which is preferably open to the atmosphere but in any event is at a relatively low pressure. The hopper is preferably cylindrical as shown at 12 and may have a conical downwardly convergent lower portion or throat as at 14 comprising the outlet of the hopper. Immediately and successively below the hopper are a first and second chamber indicated at 16 and 18 respectively. Each of these chambers, as shown in FIGURE 3, comprises a cylindrical housing having mounting flanges 20 and 22 at its top and bottom ends. The two chambers are preferably similar in construction and it will be appreciated that any desired size of the hopper 10 and the first and second chambers 16 and 18 may be provided as desired.

Although the hopper 10 is preferably open to the atmosphere at all times at its open upper end, the chamber 16 and 18 as well as the receptacle 30 into which the material is discharged are each sealed from the atmosphere. The upper end of each chamber comprises an inlet means while their lower ends comprise outlet means respectively. First, second and third connectors indicated at 32, 34 and 36 establish communication between the hopper and the first chamber 16, between the two chambers, and between the second chamber 18 and the receptacle 30 respectively. The receptacle 30 is not a part of the invention claimed herein, but designates a conventional receiver into which the material is to be fed.

Disposed in each of the connectors 32, 34, and 36 is a solenoid operated valve assembly indicated generally by the numerals 40, 42 and 44 respectively. The solenoid operated valves may be of any desired type and inasmuch as the method and apparatus of this invention as claimed hereinafter is not limited to any particular construction thereof, and since such solenoid operated valves are well understood by those skilled in the art, a further description of the same is deemed to be unnecessary.

The super-atmospheric pressure in the receptacle 30, usually maintained by steam, compressed air, other gas or fluid as by a supply conduit 50 which may be provided with a solenoid operated or other control valve 52, is connected through conduits 54 and 56 with the upper portion of the storage chamber 18. This pressure is intermittently connected through the solenoid operated control valve 60 and the conduit 58 with the upper portion of the pressurizing chamber 16. The conduit 62 connects the upper portion of the pressurizing chamber 16 to the solenoid operated vent valve 64 which normally discharges to atmosphere but may discharge into a recovery system if the pressurizing medium is obnoxious or of sufficient value to make its recovery desirable.

It will now be understood that the arrangement of connectors is such that communication between the hopper 10 and the pressurizing chamber 16 may be opened or closed as desired and similar communication between the two chambers 16 and 18 may likewise be opened or closed. The connector 36, however, is adapted to establish a continuous but adjustable communication between the chamber 18 and the receptacle 30 so as to control the rate of flow and permit fluent material to flow at a constant but controlled rate from the chamber 18 into the receptacle 30. The chamber 18 comprises a reservoir or storage chamber wherein the fluent material is stored under the pressure to which the receptacle 30 is subjected. Therefore fluent material stored under pressure in the chamber 18 is delivered at a controlled rate and in a constant flow through the third connector 36 to effect a constant flow of fluid into the receptacle.

The chamber 16 comprises a pressurizing chamber whose pressure changes from that of the low pressure area or region of the hopper 10 to that of the high pressure region of the storage chamber 18 and of the receptacle 30. For this purpose, the solenoid operated control valve 60 and the vent 64 are periodically operated so as to alternately subject the chamber 16 to the high pressure of the chamber 18 and the receptacle 30 or to the low pressure of the hopper 10.

Thus, a supply of material is maintained in the hopper 10 which is intermittently filled as required by any desired means. This material is periodically and in batches discharged through the first connector 32 into the pressurizing chamber 16 as may be required and in a cyclic operation of the various solenoid operated valves. The pressure in the first chamber 16 is reduced to that of hopper 10 when the vent 64 is opened in order that opening of the connector 32 may let low pressure fluent material descend by gravity from the hopper 10 into the pressurizing chamber 16. When the connector 32 has been closed, the solenoid operated vent valve 64 is likewise closed and the pressurizing valve 60 opened so that the pressure is raised to that of the storage chamber 18. At this time, with connector 32 being closed, the connector 34 is opened so that the pressurized material may descend by gravity from the pressurizing chamber 16 into the storage chamber 18 which is maintained by the conduit 56 at the same pressure as that of the receptacle 30. Thus, the batches prepared and received in the pressurizing chamber 16 are delivered into the storage reservoir 18 to maintain a supply of pressurized material available for transfer into the receptacle 30. Adjustably regulated connector 36 maintains a continuous supply or feed of the fluent material from the storage chamber 18 into the receptacle 30.

As previously mentioned, the cyclic operation and automatic control of the various valves is provided. Any suitable form of automatic timer or rotary switch may be employed and the diagrammatic view of FIGURE 4 is intended to illustrate such a timer having six contact points indicated by the diagrammatic indicia from 1 to 6 on FIGURE 4 by the reference numerals 70.

The chart in FIGURE 2 discloses the openings of four valves in response to the opening of each of the six contact points of the timer in succession. Inasmuch as the valves are solenoid operated valves it will be appreciated that they are appropriately wired to their respective contacts. As indicated by the diagrammatic view in FIGURE 2, the valves are actuated from between closed and opened positions in proper sequence as each contact point of the timer of FIGURE 4 is energized. The letters "C" designate closed positions and the letters "O" open positions of the respective valves while the subscripts $x$ appearing on the letters C and O indicate the valve has its position changed during the closing of that particular contact.

The valve V-1 corresponds to the connector 32 between the hopper and the pressurizing chamber 16, while the valve V-2 corresponds to the valve connector 34 between the pressurizing chamber and the storage chambers 16 and 18 respectively. The valve V-3 represents the pressurizing valve 60 while the valve V-4 represents the venting valve 64.

Thus, it will be apparent that an automatic control means is provided for sequentially and cyclically controlling the various solenoid operated valves to effect the successive discharge of material into the pressurizing chamber, the pressurizing of the pressurizing chamber, the discharge of pressurized material from the pressurizing chamber into the storage chamber and the venting of the pressurizing chamber.

Inasmuch as the third connector 36 is operated continuously but at an adjustable rate, it is not connected to the automatic timer of the other four valves but employs any other desired control means to effect a controlled regulated opening of the latter.

It will be appreciated that this invention relates to an apparatus and a method for feeding fluent materials into various types of industrial or treating apparatuses for subsequently treating those materials. It is concerned therefore primarily with effecting of a controlled but continuous flow of pressurized material into a high pressure receptacle from a low pressure source under the influence of gravity and by batches of material withdrawn from a low pressure source.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An apparatus for the gravity feed of fluent material in discrete batches intermittently withdrawn from a region of relatively low pressure and discharged as a continuous and uninterrupted stream into a region of relatively high pressure, said apparatus comprising a hopper constituting a region of relatively low pressure, a receptacle constituting a region of relatively high pressure, first and second chambers interposed between said hopper and receptacle, each of said chambers and receptacle being sealed from the atmosphere, an inlet and outlet for each of said hopper, chambers and receptacle, first, second and third connector establishing communication respectively between said hopper and first chamber, between said chambers and between said second chamber and receptacle, control valves in each connector, means sequentially operating said control valves and thereby establish a step by step flow of material from said hopper to said first chamber and between said chamber and means operating said control valve in said third connector and effecting a continuous and uninterrupted but variable rate flow between said second chamber and said receptacle, means for maintaining said relatively high pressure in said second chamber and receptacle, means for changing the pressure in said first chamber from said relatively low pressure of said hopper when the control valve of said first connector is open and admitting a batch of material from said hopper into said first chamber to said relatively high pressure when said control valve of said second connector is admitting material from said first chamber into said second chamber.

2. The combination of claim 1 including means for venting the interior of said first chamber, a control valve associated with said vent means and connected to said sequential operating means and actuated thereby.

3. The combination of claim 1 wherein said control valve in said third connector is operable to vary the rate of flow of material into said receptacle and is incapable of causing complete stopping of flow.

References Cited by the Examiner

UNITED STATES PATENTS

| | | | |
|---|---|---|---|
| 2,138,356 | 11/38 | Ryan et al. | 141—7 |
| 2,723,057 | 11/55 | Golden | 222—447 X |
| 2,732,107 | 1/56 | Ridley | 222—450 X |
| 2,879,809 | 3/59 | Vogt | 141—12 |
| 2,935,233 | 5/60 | Vogt | 141—1 |
| 2,949,275 | 8/60 | Pro | 222—450 X |
| 3,058,498 | 10/62 | Vogt | 141—5 |
| 3,090,593 | 5/63 | Pro | 222—450 |

RAPHAEL M. LUPO, *Primary Examiner.*